Jan. 8, 1946.  F. R. BALCAR  2,392,303
PRODUCTION OF ACRYLIC NITRILE
Filed Aug. 4, 1943
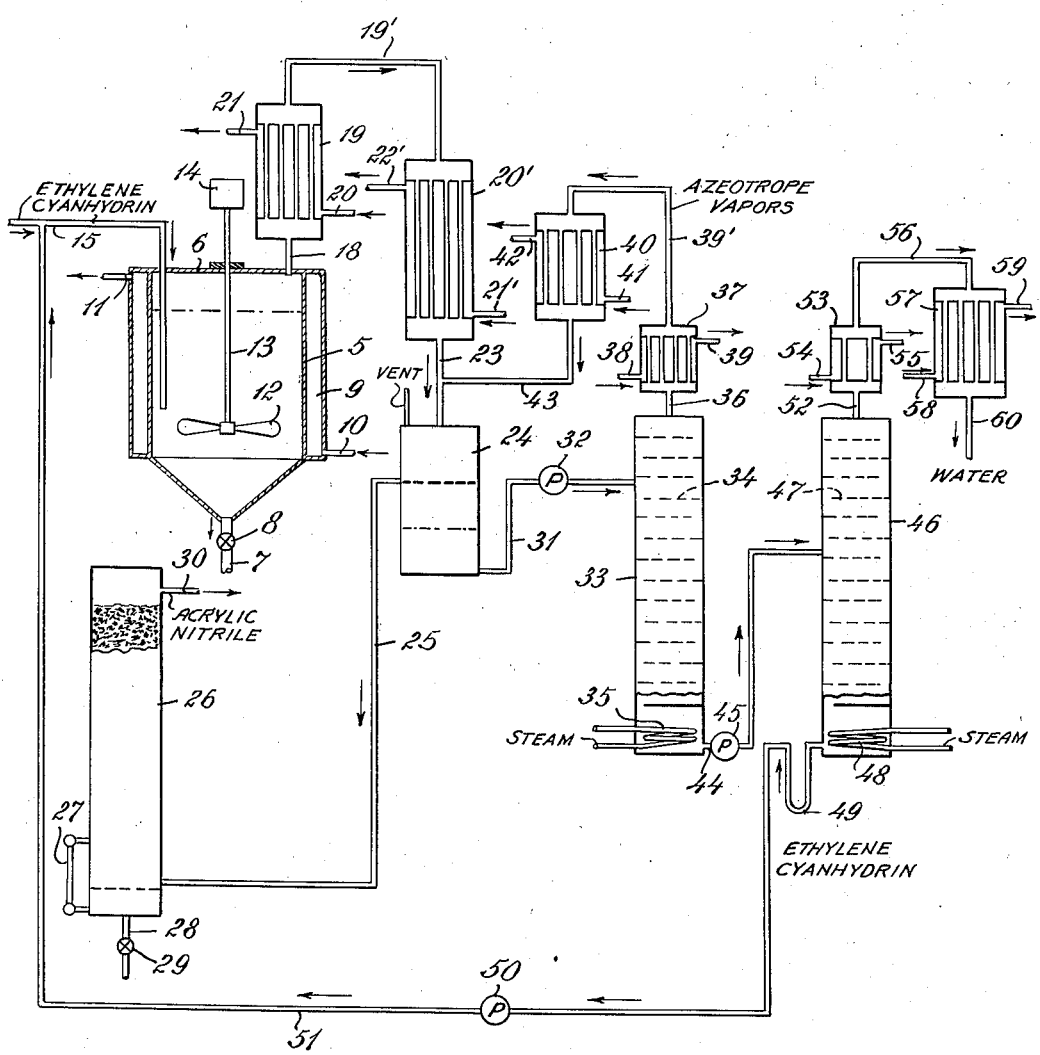
INVENTOR
Frederick R. Balcar
BY
ATTORNEYS

UNITED STATES PATENT OFFICE 2,392,303

PRODUCTION OF ACRYLIC NITRILE

Frederick R. Balcar, Stamford, Conn., assignor to Air Reduction Company, Incorporated, New York, N. Y., a corporation of New York Application August 4, 1943, Serial No. 497,335

10 Claims. (Cl. 260—464)

This invention relates to the production of acrylic nitrile (also known as vinyl cyanide) by dehydration of ethylene cyanhydrin, in accordance with the reaction:

$$CH_2OHCH_2CN \rightarrow CH_2{:}CHCN + H_2O$$

It has been suggested previously that acrylic nitrile may be produced by the dehydration of ethylene cyanhydrin, but the procedure as known is a batch operation and subject to numerous disadvantages in so far as practical commercial application of the reaction is concerned. It has not been possible heretofore to conduct the reaction in a continuous manner and on an efficient and economical basis.

It is the object of the present invention to provide a simple and practicable procedure whereby ethylene cyanhydrin may be converted in a continuous manner by dehydration to produce acrylic nitrile in a commercially acceptable form.

Other objects and advantages of the invention will be apparent as it is better understood by reference to the following specification and the accompanying drawing, which illustrates diagrammatically an apparatus suitable for the practice of the invention.

I have discovered that acrylic nitrile may be produced advantageously by heating ethylene cyanhydrin in relatively low concentrations in an inert liquid including a dehydration catalyst and in the absence of substantial amounts of water in the liquid phase. The procedure requires the maintenance of a body of a suitable liquid at a temperature favorable to the reaction, preferably in the neighborhood of 251–255° C. The catalyst may be dissolved or suspended in the liquid. The ethylene cyanhydrin is introduced at substantially the rate at which conversion occurs so that no substantial amount of ethylene cyanhydrin remains at any time in the liquid. The resulting vapor including acrylic nitrile is withdrawn continuously as produced and treated to separate acrylic nitrile and to return the unconverted ethylene cyanhydrin for further treatment.

While I prefer to operate at a temperature between 251° and 255° C., the temperature limit for operation varies over a considerable range, for example between 220° and 350° C. At the lower limit the reaction tends to become too slow to warrant commercial operation. At the upper limit there is a tendency toward undesired side and decomposition reactions.

Many different types of liquids may be utilized in the heating bath. In general, the characteristics of such a liquid should be that it is inert under the conditions of operation, that is, that the liquid does not decompose and does not react with ethylene cyanhydrin or the products of the dehydration thereof. The liquid should not have a boiling point below that of the reaction temperature, although such a liquid may be used if the reaction is conducted under pressure. Preferably I operate at atmospheric pressure with a liquid which does not boil under such pressure at the selected temperature.

It is not necessary that the heating liquid and the ethylene cyanhydrin should be completely miscible. The operation is conducted so that there is no accumulation of ethylene cyanhydrin in the heating liquid. It is, however, believed that slight solubility of ethylene cyanhydrin in the heating liquid of the order of 1% or less is favorable to the reaction, but in this respect I do not wish to be restricted to any particular theory.

Among the liquids which are suitable for use as heating liquids are diphenyl ethane, hexaethyl benzene, benzyl ether, a mixture of diphenyl and diphenyl oxide known as "Dowtherm," a refined petroleum product known as "Nujol," Texas Co. "Hydra Oil" (a petroleum product somewhat similar to Texas Co. #531 wash oil), Texas Co. #531 wash oil, a topped fuel oil having a boiling point of 260°–270° C., Bunker C oil and a higher alcohol known to the trade as "cyclic $C_{18}$ alcohol." Obviously the chemical composition of the bath liquid may vary. The essential characteristics have been indicated. Undoubtedly a considerable number of additional materials having similar characteristics and therefore available for the purpose, could be selected.

Any suitable dehydration catalyst may be employed for the purpose of the invention. I prefer to use "ammonium phosphate." The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resultant salt or salts in the heating bath at the temperature maintained cannot be determined accurately. Any of the phosphates mentioned or the resulting products in the heating bath are active catalysts for the reaction.

The catalyst may be introduced to the heating bath as such, but I prefer to mount it on a suitable finely divided support such as carbon, coke, "Filtercel," "Celite," kaolin or clays and the like.

The supported catalyst may be prepared in any of the well known ways, for example by evaporation to dryness of an aqueous solution of the phosphate in contact with the finely divided supporting material while the solution is stirred to ensure uniform impregnation of the support. For example, 6 parts by weight of "diammonium phosphate" in about 50 parts of water may be added to 12 parts of "Filtercel." The mass is then evaporated to dryness with continuous stirring.

The use of a mounted catalyst in general results in more efficient operation. The unmounted catalyst has a tendency to coalesce when suspended in a heating liquid. If mounted as described, it can be maintained in suspension and uniformly distributed throughout the heating liquid. Preferably the heating liquid should be agitated to maintain the desired suspension and consequently uniform contact of the ethylene cyanhydrin with the catalyst in the heating liquid. While ammonium phosphate is preferred as a catalyst for the reaction, various other catalysts are available and can be used. Among them are phosphoric acid, toluene sulphonic acid, ammonium sulphate, a mixture of calcium and ammonium phosphates, aniline phosphate, acid sodium phosphate, kaolin and clays such as Attapulgus clay. These catalysts may be used as such or mounted on supports as in the case of ammonium phosphate.

The proportion of catalyst is largely dependent upon the catalytic area exposed. If the catalytic material is finely divided, less of it is required. Experience has shown that when the catalyst is in relatively large pieces, say 4-8 mesh, it may be necessary to employ 50% by weight based upon the heating liquid. If, however, the catalyst is finely divided, an amount of 2% by weight of the liquid or even less is required to ensure adequate activity. The fineness of the catalyst and the proportion thereof can be varied within wide limits to secure the desired result.

The procedure will be readily understood by reference to the drawing which is merely illustrative of suitable equipment for the purpose. The reactor 5 is a receptacle having a closure 6 and an outlet 7 controlled by a valve 8. A heating jacket 9 is adapted to be supplied through a pipe 10 with a suitable heating liquid which escapes through a pipe 11 and is reheated for circulation through the jacket. Any suitable heating liquid adapted to be maintained at the desired temperature may be employed. "Dowtherm" is well adapted for the purpose, since it may be readily maintained at the desired temperature to heat the body of the liquid within the reactor 5. An agitator 12 is supported on a shaft 13 and is adapted to be driven from any suitable source such as a motor 14 to maintain the desired agitation during the reaction.

The reactor 5 is partially filled with a selected heating liquid in which the catalyst is suspended or dissolved. Ethylene cyanhydrin is introduced through a pipe 15 from any suitable source of supply at substantially the rate of reaction. The ethylene cyanhydrin enters beneath the surface of the liquid in the reactor and immediately is raised to the temperature of the heating liquid while it is brought into contact with the catalyst. As the result, acrylic nitrile is produced and escapes, together with water vapor formed as the result of the reaction, some unreacted ethylene cyanhydrin and possible some entrained heating liquid, through a pipe 18. The vapors pass to a reflux condenser 19 which is maintained at a temperature such as to condense the bulk of the unreacted ethylene cyanhydrin and entrained heating liquid by cooling water circulated through pipes 20 and 21. The unreacted ethylene cyanhydrin is delivered by the pipe 18 to the reactor.

The remaining vapors escape through a pipe 19' to a condenser 20' supplied with cooling water which circulates through pipes 21' and 22'. The condensate, consisting principally of acrylic nitrile, some water and some unreacted ethylene cyanhydrin, is delivered by a pipe 23 to a collector 24. In the collector, the condensate separates into two layers, the upper of which consists of acrylic nitrile containing some water. This layer is withdrawn through a pipe 25 and is delivered to suitable dehydration equipment such for example as a tower 26 packed with any suitable dehydrating agent such as calcium chloride. The tower 26 is provided with a sight glass 27 near its bottom and the water accumulating therein may be withdrawn from time to time through a pipe 28 provided with a valve 29. The dried acrylic nitrile is withdrawn through a pipe 30 at the top of the tower. Any other suitable drying equipment such as a fractionating column equipped with a reflux condenser, total condenser and separator may be substituted for the tower 26. In such equipment, water is removed from the acrylic nitrile as a binary azeotrope boiling at about 70° C. The azeotrope is condensed and separated, the water layer being discarded and the acrylic nitrile layer returned with the fresh feed. The dried acrylic nitrile is removed from the bottom of the fractionating column. In either case, the dried acrylic nitrile may be distilled, if desired, but ordinarily it is sufficiently pure for subsequent use in synthesis operations.

The lower layer in the separator 24 consists of water containing some acrylic nitrile and ethylene cyanhydrin. It is delivered by a pipe 31 and pump 32 to a fractionating column 33 provided with trays 34 or other means to facilitate contact between liquid and vapors in the column. The bottom of the column is heated by steam introduced through a coil 35. Vapors rising through the column are delivered by a pipe 36 to a condenser 37 which is maintained by water circulating through the pipes 38 and 39 at a temperature of approximately 70° C., which is the boiling point of the binary azeotrope of acrylic nitrile and water. Products in the vapors having higher boiling points are returned to the column. The azeotrope vapors are delivered by a pipe 39' to a condenser 40 cooled by water circulating through pipes 41 and 42, and the condensate is returned by a pipe 43 to the separator 24. Thus all of the acrylic nitrile is recovered.

The liquid, consisting of water containing ethylene cyanhydrin, is withdrawn from the column 33 through a pipe 44 and delivered by a pump 45 to a fractionating column 46 having trays 47 or other means to facilitate contact of the liquid with vapors in the column. The bottom of the column is heated by steam introduced through a coil 48. Since ethylene cyanhydrin forms no azeotrope with water, it may be readily separated therefrom and withdrawn from the bottom of the column through a pipe 49 and returned by a pump 50 through pipe 51 to the pipe 15 and thus to further contact with the catalyst in the reactor 5.

Vapor from the column 46 escapes through a pipe 52 to a reflux condenser 53 cooled by water circulated through pipes 54 and 55. The uncondensed vapor, consisting of water, is delivered through a pipe 56 to a condenser 57 cooled by water supplied through pipes 58 and 59. The condensed water escapes through a pipe 60 and is discharged.

The procedure as described permits the continuous conversion of ethylene cyanhydrin, a liquid boiling at 221° C., to acrylic nitrile, boiling at 78°–79° C., and substantially avoids losses, since unconverted ethylene cyanhydrin is recovered and returned for further treatment with the catalyst and the acrylic nitrile is recovered completely and substantially free from water.

The following examples of the application of the invention in laboratory apparatus will sufficiently illustrate the procedure:

Example I 275 cc. of diphenyl ethane were placed in a 500 cc. flask equipped with an inlet tube dipping below the diphenyl ethane, an outlet tube leading to a condenser, a thermometer in the liquid, and means for heating the flask and its contents. 6 grams of powdered "diammonium phosphate" were added to the liquid in the flask, and the mixture was heated to about 260° C. Ethylene cyanhydrin was introduced into the flask below the liquid level therein at the rate of 18.9 grams per hour, while the bath was maintained at 251°–255° C. The separated water and the acrylic nitrile were distilled from the flask, condensed, and the resultant two layers separated. The acrylic nitrile layer was then dried by means of calcium chloride and distilled. Some unchanged ethylene cyanhydrin and acrylic nitrile were dissolved in the aqueous layer. As hereinbefore indicated, the aqueous layer can be treated to recover the valuable products remaining therein. A yield of 87% of acrylic nitrile was obtained in this procedure.

Example II

In the same apparatus, 275 cc. of Texas Co. "Hydra Oil" were placed with 27.5 grams of a catalyst composed of equal parts of "Filtercel" and "diammonium phosphate." The temperature of the liquid in the reactor was about 254° C., and the feed of ethylene cyanhydrin was 20.9 grams per hour. A yield of 81% of acrylic nitrile was obtained.

Example III

In this case, 275 cc. of Texas Co. #531 wash oil was used in the apparatus hereinbefore described with 27.5 grams of a catalyst composed of equal parts of "Filtercel" and "diammonium phosphate." The bath liquid was maintained at a temperature of about 254° C., and ethylene cyanhydrin was fed at the rate of 21.8 grams per hour. The yield of acrylic nitrile was 79%.

In the several examples, the yield was calculated without recovery of products from the aqueous layer in the collector. The recovery of these products in accordance with the invention will materially improve the yield of acrylic nitrile in commercial operation.

Various changes may be made in the procedure and the apparatus as described without departing from the invention or sacrificing the advantages thereof.

I claim:

1. The method of producing acrylic nitrile by dehydration of ethylene cyanhydrin which comprises maintaining a body of non-aqueous inert liquid including a dehydration catalyst at a temperature between 220° and 350° C., feeding ethylene cyanhydrin thereto at substantially the rate at which conversion to acrylic nitrile occurs, maintaining a concentration of not more than 1% of ethylene cyanhydrin in a body of inert liquid, withdrawing and condensing the vapors from the body of liquid and separating acrylic nitrile therefrom.

2. The method of producing acrylic nitrile by dehydration of ethylene cyanhydrin which comprises maintaining a body of non-aqueous inert liquid including a dehydration catalyst at a temperature between 220° and 350° C., feeding ethylene cyanhydrin thereto at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, and removing water from the acrylic nitrile.

3. The method of producing acrylic nitrile by dehydration of ethylene cyanhydrin which comprises maintaining a body of non-aqueous inert liquid including a dehydration catalyst at a temperature between 220° and 350° C., feeding ethylene cyanhydrin thereto at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, and removing water from the acrylic nitrile by contact with a drying agent.

4. The method of producing acrylic nitrile by dehydration of ethylene cyanhydrin which comprises maintaining a body of non-aqueous inert liquid including a dehydration catalyst at a temperature between 220° and 350° C., feeding ethylene cyanhydrin thereto at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, recovering unreacted ethylene cyanhydrin from the remainder of the condensate and returning it for further contact with the dehydration catalyst.

5. The method of producing acrylic nitrile by dehydration of ethylene cyanhydrin which comprises maintaining a body of non-aqueous inert liquid including a dehydration catalyst at a temperature between 220° and 350° C., feeding ethylene cyanhydrin thereto at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, fractionating the remainder of the condensate to separate acrylic nitrile and water therefrom, and returning the unreacted ethylene cyanhydrin thus recovered for further contact with the dehydration catalyst.

6. The method of producing acrylic nitrile by dehydration of ethylene cyanhydrin which comprises maintaining and agitating a body of non-aqueous inert liquid with a dehydration catalyst suspended therein at a temperature between 220° and 350° C., feeding ethylene cyanhydrin at substantially the rate at which conversion to acrylic nitrile occurs, maintaining a concentration of not more than 1% of ethylene cyanhydrin in a body of inert liquid, withdrawing and condensing the vapors from the body of liquid and separating acrylic nitrile therefrom.

7. The method of producing acrylic nitrile by dehydration of ethylene cyanhydrin which comprises maintaining and agitating a body of non-aqueous inert liquid with a dehydration catalyst suspended therein at a temperature between 220° and 350° C., feeding ethylene cyanhydrin at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, and removing water from the acrylic nitrile.

8. The method of producing acrylic nitrile by dehydration of ethylene cyanhydrin which comprises maintaining and agitating a body of non-aqueous inert liquid with a dehydration catalyst suspended therein at a temperature between 220° and 350° C., feeding ethylene cyanhydrin at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, and removing water from the acrylic nitrile by contact with a drying agent.

9. The method of producing acrylic nitrile by dehydration of ethylene cyanhydrin which comprises maintaining and agitating a body of non-aqueous inert liquid with a dehydration catalyst suspended therein at a temperature between 220° and 350° C., feeding ethylene cyanhydrin at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, recovering unreacted ethylene cyanhydrin from the remainder of the condensate and returning it for further contact with the dehydration catalyst.

10. The method of producing acrylic nitrile by dehydration of ethylene cyanhydrin which comprises maintaining and agitating a body of non-aqueous inert liquid with a dehydration catalyst suspended therein at a temperature between 220° and 350° C., feeding ethylene cyanhydrin at substantially the rate at which conversion to acrylic nitrile occurs, maintaining a concentration of not more than 1% of ethylene cyanhydrin in a body of inert liquid, withdrawing and condensing the vapors from the body of liquid, separating acrylic nitrile therefrom, fractionating the remainder of the condensate to separate acrylic nitrile and water therefrom and returning the unreacted ethylene cyanhydrin thus recovered for further contact with the dehydration catalyst.

FREDERICK R. BALCAR.